(12) United States Patent
On et al.

(10) Patent No.: US 11,384,660 B1
(45) Date of Patent: Jul. 12, 2022

(54) FAN COWL FAILSAFE GOOSENECK ASSEMBLY

(71) Applicant: ROHR, INC., Chula Vista, CA (US)

(72) Inventors: Win On, Singapore (SG); Mohamedali Limalia, Kuala Lumpur (MY)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/133,351

(22) Filed: Dec. 23, 2020

(51) Int. Cl.
| | |
|---|---|
| *F01D 25/24* | (2006.01) |
| *E05D 5/06* | (2006.01) |
| *E05D 3/02* | (2006.01) |

(52) U.S. Cl.
CPC ............... *F01D 25/24* (2013.01); *E05D 3/02* (2013.01); *E05D 5/06* (2013.01); *E05D 2005/067* (2013.01); *E05Y 2900/502* (2013.01); *F05D 2220/323* (2013.01)

(58) Field of Classification Search
CPC .. F01D 25/24; E05D 3/02; E05D 5/06; E05D 2005/067; E05Y 2900/502; F05D 2220/323

See application file for complete search history.

(56) References Cited

U.S. PATENT DOCUMENTS

| | | | | |
|---|---|---|---|---|
| 4,854,010 A | * | 8/1989 | Maraghe | B64C 1/1407 49/248 |
| 5,157,915 A | * | 10/1992 | Bart | F01D 25/243 244/54 |
| 6,155,520 A | * | 12/2000 | Giraud | B64D 29/06 244/129.4 |
| 6,517,027 B1 | | 2/2003 | Abruzzese | |
| 8,439,308 B2 | | 5/2013 | Armstrong et al. | |
| 9,758,234 B2 | | 9/2017 | Harding et al. | |
| 9,873,504 B2 | * | 1/2018 | Aten | F01D 25/24 |
| 2013/0042435 A1 | | 2/2013 | Schott | |
| 2016/0362921 A1 | * | 12/2016 | Dey | F16B 2/22 |
| 2019/0218840 A1 | | 7/2019 | Hacault | |
| 2019/0284856 A1 | | 9/2019 | Geliot et al. | |
| 2020/0172255 A1 | | 6/2020 | Khiong | |

OTHER PUBLICATIONS

European Patent Office, European Search Report dated May 10, 2022 in Application No. 21216399.2.

* cited by examiner

*Primary Examiner* — Igor Kershteyn
(74) *Attorney, Agent, or Firm* — Snell & Wilmer L.L.P.

(57) ABSTRACT

A gooseneck hinge assembly includes a first gooseneck hinge portion having a first portion first end coupled to a first surface, a first portion second end having a first portion aperture to receive a pin, and a first gooseneck curve between the first portion first end and the first portion second end. The assembly further includes a second gooseneck hinge portion being a mirror image of the first hinge portion and having a second portion first end coupled to the first surface, a second portion second end having a second portion aperture to receive the pin, and a second gooseneck curve between the second portion first end and the second portion second end. The assembly further includes the pin coupled to a second surface and to extend through the first portion aperture and the second portion aperture to facilitate rotation of the second surface relative to the first surface.

20 Claims, 4 Drawing Sheets

FAN COWL FAILSAFE GOOSENECK ASSEMBLY

FIELD

The present disclosure relates to nacelles and, more particularly, to gooseneck hinges that facilitate rotation of a first panel of a nacelle relative to a second panel of a nacelle.

BACKGROUND

Gas turbine engine systems for modern aircraft often include a nacelle. The nacelle provides various functionalities such as reducing engine noise, providing a smooth surface for airflow through and around a gas turbine engine, thrust reversing capabilities, and the like. In certain situations, it may be desirable for two panels of the nacelle to be capable of relative rotation. For example, this may facilitate opening of a thrust reverser, opening of a fan cowl, or the like.

SUMMARY

Disclosed herein is a gooseneck hinge assembly. The gooseneck hinge assembly includes a first gooseneck hinge portion having a first portion first end configured to be coupled to a first surface, a first portion second end having a first portion aperture configured to receive a pin, and a first gooseneck curve between the first portion first end and the first portion second end. The gooseneck hinge assembly further includes a second gooseneck hinge portion being a mirror image of the first gooseneck hinge portion and having a second portion first end configured to be coupled to the first surface, a second portion second end having a second portion aperture configured to receive the pin, and a second gooseneck curve between the second portion first end and the second portion second end. The gooseneck hinge assembly further includes the pin coupled to a second surface and configured to extend through the first portion aperture and the second portion aperture to facilitate rotation of the second surface relative to the first surface.

In any of the foregoing embodiments, the first gooseneck hinge portion defines a first portion flange configured to extend parallel to the first surface and to be coupled to the first surface, and the second gooseneck hinge portion defines a second portion flange configured to extend away from the first portion flange, to extend parallel to the first surface, and to be coupled to the first surface.

Any of the foregoing embodiments may further include a receiving attachment configured to be coupled to the second surface and defining a U-shaped slot for receiving the first portion second end and the second portion second end such that the pin extends through the receiving attachment, the first portion aperture, and the second portion aperture.

In any of the foregoing embodiments, the receiving attachment further includes a receiving flange extending parallel to the second surface and configured to be coupled to the second surface.

In any of the foregoing embodiments, the first gooseneck hinge portion, the second gooseneck hinge portion, and the receiving attachment are each composed in part of a metallic material.

In any of the foregoing embodiments, the U-shaped slot is configured to receive a portion of the first gooseneck curve and second gooseneck curve in response to the rotation of the second surface relative to the first surface.

In any of the foregoing embodiments, the gooseneck hinge assembly is configured for use with a nacelle of an aircraft.

In any of the foregoing embodiments, the first surface is a first composite panel of the nacelle and the second surface is a second composite panel of the nacelle.

In any of the foregoing embodiments, the first composite panel defines a bump-up, the first gooseneck hinge portion defines a first portion flange configured to extend parallel to the first surface and to be coupled to the bump-up, and the second gooseneck hinge portion defines a second portion flange configured to extend away from the first portion flange, to extend parallel to the first surface, and to be coupled to the bump-up.

In any of the foregoing embodiments, at least one of the first composite panel or the second composite panel is a portion of a fan cowl of the nacelle.

Also disclosed is a gooseneck hinge assembly for use in a nacelle. The gooseneck hinge assembly includes a first gooseneck hinge portion having a first portion first end configured to be coupled to a first panel, a first portion second end having a first portion aperture configured to receive a pin, and a first gooseneck curve between the first portion first end and the first portion second end. The gooseneck hinge assembly further includes a second gooseneck hinge portion being a mirror image of the first gooseneck hinge portion and having a second portion first end configured to be coupled to the first panel, a second portion second end having a second portion aperture configured to receive the pin, and a second gooseneck curve between the second portion first end and the second portion second end. The gooseneck hinge assembly further includes the pin coupled to a second panel and configured to extend through the first portion aperture and the second portion aperture to facilitate rotation of the second panel relative to the first panel.

In any of the foregoing embodiments, the first gooseneck hinge portion defines a first portion flange configured to extend parallel to the first panel and to be coupled to the first panel, and the second gooseneck hinge portion defines a second portion flange configured to extend away from the first portion flange, to extend parallel to the first panel, and to be coupled to the first panel.

Any of the foregoing embodiments may further include a receiving attachment configured to be coupled to the second panel and defining a U-shaped slot for receiving the first portion second end and the second portion second end such that the pin extends through the receiving attachment, the first portion aperture, and the second portion aperture.

In any of the foregoing embodiments, the receiving attachment further includes a receiving flange extending parallel to the second panel and configured to be coupled to the second panel.

In any of the foregoing embodiments, the first gooseneck hinge portion, the second gooseneck hinge portion, and the receiving attachment are each composed in part of a metallic material.

In any of the foregoing embodiments, the U-shaped slot is configured to receive a portion of the first gooseneck curve and the second gooseneck curve in response to the rotation of the second panel relative to the first panel.

In any of the foregoing embodiments, the first panel defines a bump-up, the first gooseneck hinge portion defines a first portion flange configured to extend parallel to the first panel and to be coupled to the bump-up, and the second gooseneck hinge portion defines a second portion flange configured to extend away from the first portion flange, to extend parallel to the first panel, and to be coupled to the bump-up.

In any of the foregoing embodiments, at least one of the first panel or the second panel is a portion of a fan cowl of the nacelle.

Also disclosed is a gooseneck hinge assembly. The gooseneck hinge assembly includes a first gooseneck hinge portion having a first portion first end configured to be coupled to a first surface, a first portion second end having a first portion aperture configured to receive a pin, and a first gooseneck curve between the first portion first end and the first portion second end. The gooseneck hinge assembly further includes a second gooseneck hinge portion being a mirror image of the first gooseneck hinge portion and having a second portion first end configured to be coupled to the first surface, a second portion second end having a second portion aperture configured to receive the pin, and a second gooseneck curve between the second portion first end and the second portion second end. The gooseneck hinge assembly further includes a receiving attachment configured to be coupled to a second surface and defining a U-shaped slot for receiving the first portion second end and the second portion second end. The gooseneck hinge assembly further includes the pin configured to extend through the receiving attachment, the first portion aperture, and the second portion aperture to facilitate rotation of the second surface relative to the first surface.

In any of the foregoing embodiments, the first gooseneck hinge portion defines a first portion flange configured to extend parallel to the first surface and to be coupled to the first surface, and the second gooseneck hinge portion defines a second portion flange configured to extend away from the first portion flange, to extend parallel to the first surface, and to be coupled to the first surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
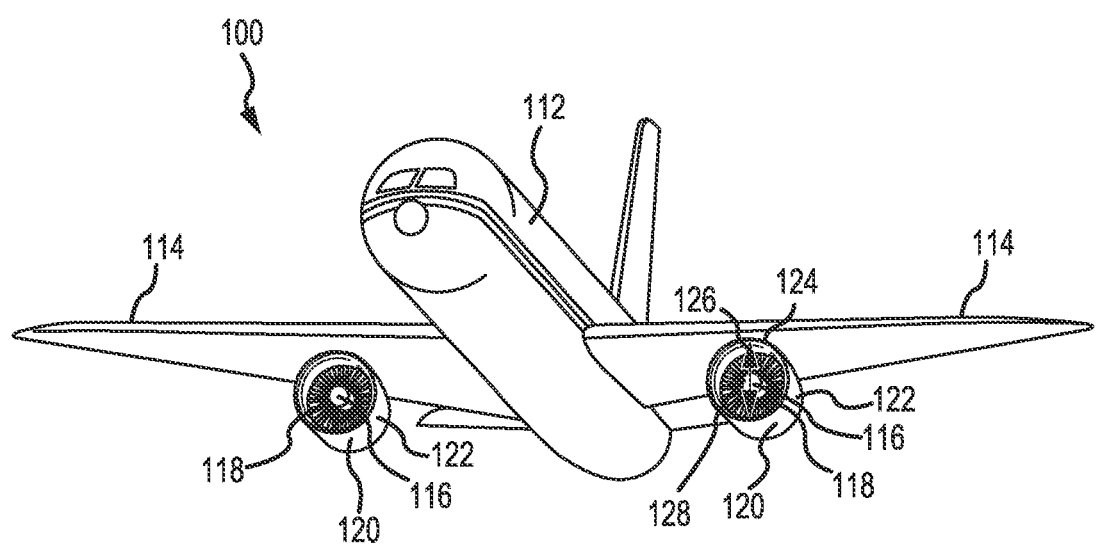
FIG. 1 illustrates a perspective view of an aircraft in accordance with various embodiments.

In various embodiments and with reference to FIG. 1, an aircraft 100 may comprise a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for the aircraft 100.

Figure 2:
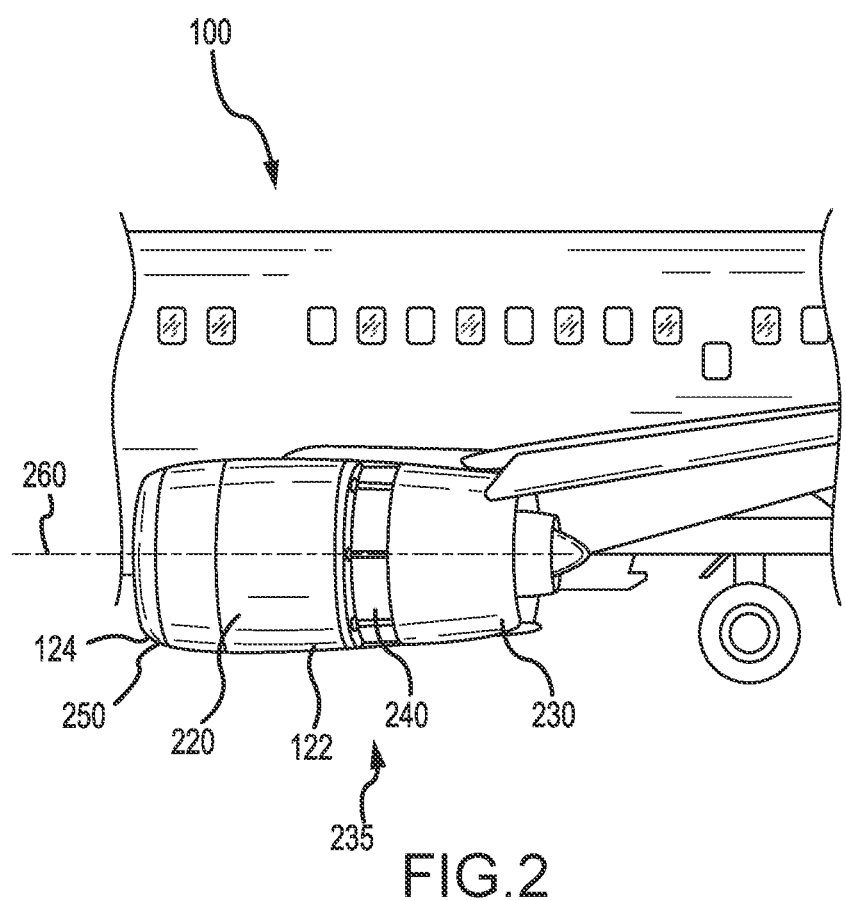
FIG. 2 illustrates a side view of the aircraft of FIG. 1 including a nacelle in accordance with various embodiments.

In various embodiments, the propulsion system 120 may comprise an engine including a fan 118 and an engine core 116, housed within a nacelle assembly 122. With reference to FIGS. 1 and 2, the typical nacelle assembly, or more simply a nacelle assembly 122, may comprise an inlet 124, a fan cowl 220, a thrust reverser 235, and an exhaust system. The nacelle assembly 122 surrounds the engine core 116 providing smooth aerodynamic surfaces for airflow around and into the engine. The nacelle also helps define a bypass air duct through the propulsion system 120.

The inlet 124 has a center 128 and a diameter 126 that extends through the center. The diameter of the inlet 124 may be, for example, between 60 inches (1.52 meters (m)) and 120 inches (3 m), between 70 inches (1.8 m) and 90 inches (2.3 m), or about 80 inches (2.0 m). However, one skilled in the art will realize that any diameter 126 may be present without departing from the scope of the present disclosure.

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system aft of the engine for thrust.

In various embodiments and with reference to FIG. 2, a thrust reverser system 235 of the aircraft 100 may be included in the nacelle assembly 122 and may include a translating sleeve 230 and a cascade, or cascade array, 240. The nacelle assembly 122 may include an axis 260. The thrust reverser system 235 may also comprise an air diversion system that is configured to direct airflow in the bypass duct through the cascade to create reverse thrust. The air diversion system may be any suitable system including, for example, blocker doors, diversion doors, and/or the like.

Figure 3:
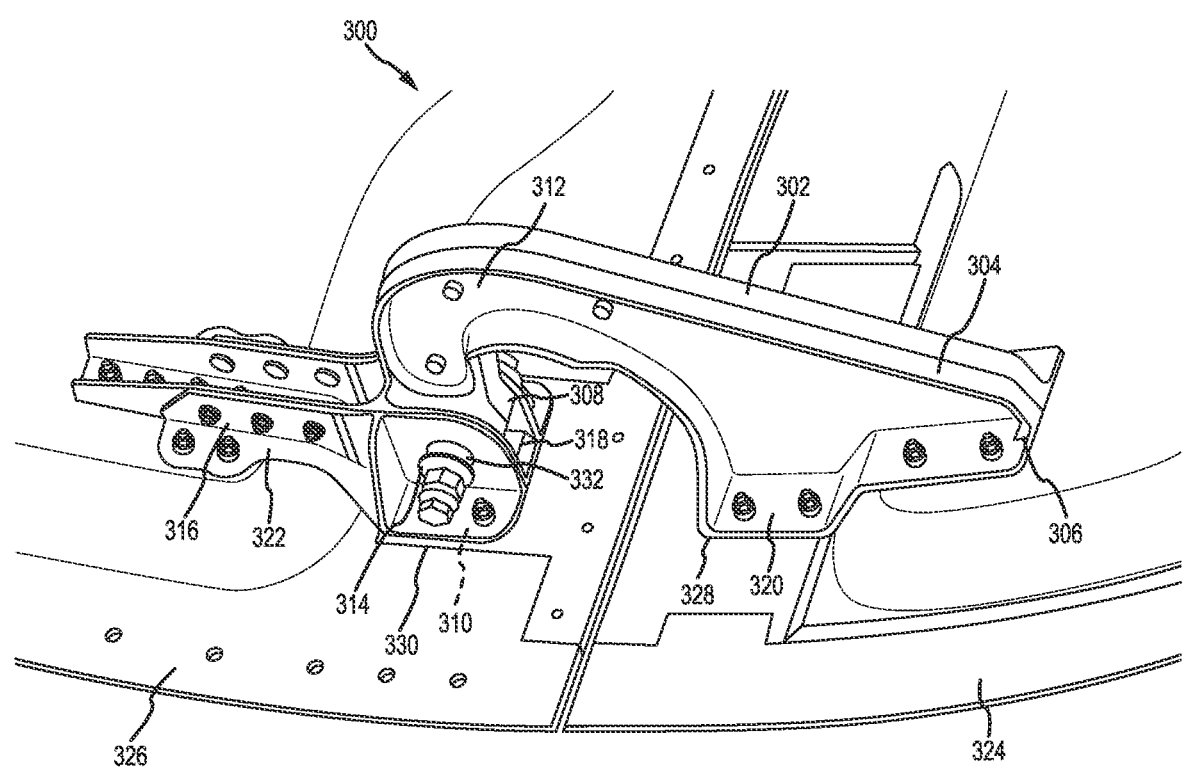
FIG. 3 illustrates a perspective view of a gooseneck hinge assembly for use in a nacelle in accordance with various embodiments.
Figure 4:
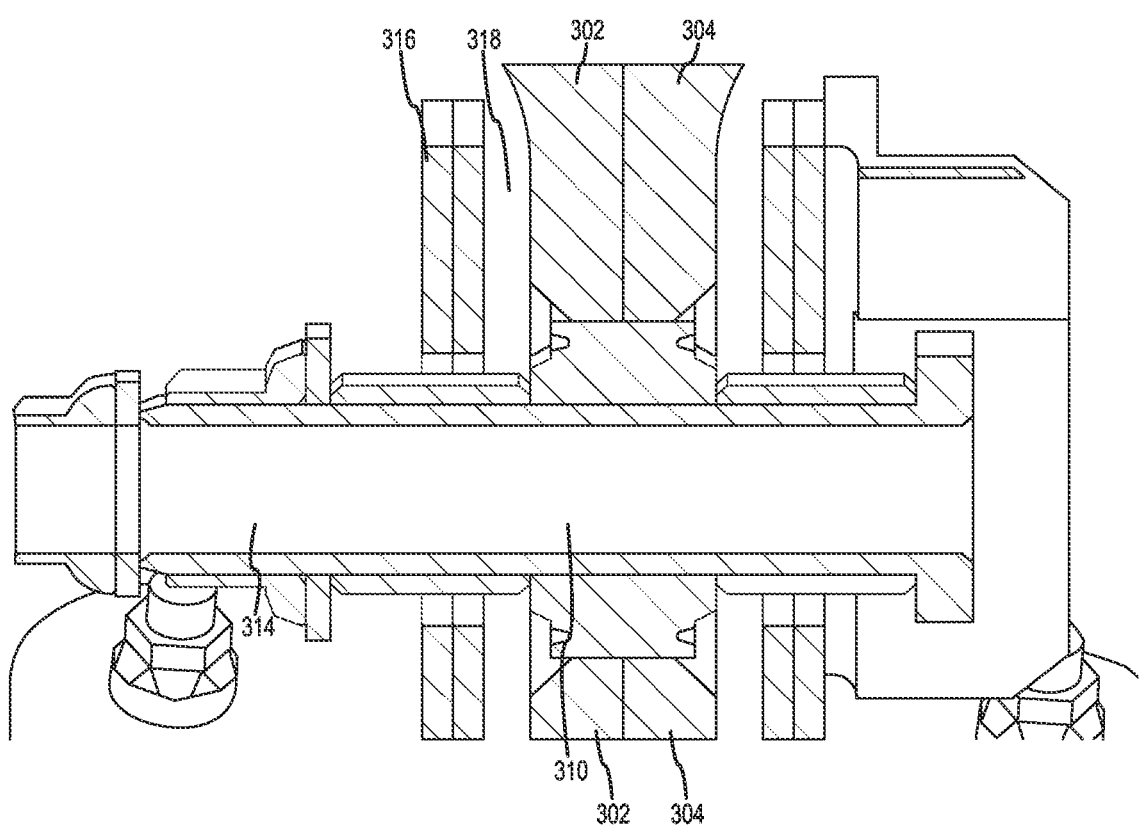
FIG. 4 illustrates a cross-sectional view of the gooseneck hinge assembly of FIG. 3 in accordance with various embodiments.

Referring now to FIGS. 3 and 4, a gooseneck hinge assembly 300 may be used between two panels (e.g., a first panel 324 and a second panel 326) of a portion of the nacelle assembly 122 of FIG. 1, such as the fan cowl 220 of FIG. 2 to allow rotation of a first panel relative to a second panel. In various embodiments, the gooseneck hinge assembly 300 may be used between any two surfaces to facilitate rotation of a first surface relative to a second surface. Unlike conventional hinges, the gooseneck hinge assembly 300 provides redundancy should a portion of the gooseneck hinge assembly 300 become inoperable, as described below.

The gooseneck hinge assembly 300 includes a first gooseneck hinge portion 302 and a second gooseneck hinge portion 304 which is a mirror image of the first gooseneck hinge portion 302. Each of the portions 302, 304 have a first end 306 and a second end 308 with a gooseneck curve 312 therebetween. The second end 308 defines an aperture 310 for receiving a pin 314. The portions 302, 304 may further define or include a flange 320 designed to be coupled to a surface. In various embodiments, the flange 320 may be located closer to the first end 306 than the second end 308.

In various embodiments, the portions 302, 304 may be coupled together. For example, the portions 302, 304 may be coupled together via fasteners 352, an adhesive, or any other fastening means capable of permanently or removably coupling the portions 302, 304 together.

The gooseneck hinge assembly 300 further includes a receiving attachment 316 that defines a U-shaped slot 318 extending along at least a portion thereof in a direction parallel to a longitudinal axis of the portions 302, 304. The receiving attachment 316 may further include a flange 322 designed to be coupled to a surface.

As referenced above, the assembly 300 may be utilized in a nacelle. In that regard, the gooseneck hinge assembly 300 may facilitate rotation of a first surface (such as a first panel 324) relative to a second surface (such as a second panel 326). The panels 324, 326 may be, for example, composite panels used in a nacelle, such as in a fan cowl. In that regard, the first panel 324 may rotate away from the second panel 326 to provide access to an interior of the nacelle (e.g., where the assembly 300 is located) for various reasons.

The first ends 306 of the gooseneck hinge portions 302, 304 may be coupled to the first panel 324. For example, the first ends 306 may be coupled to the first panel 324 at the flanges 320. In various embodiments, the first panel 324 may include a bump-up 328 onto which the flanges 320 are fastened, such as by use of fasteners or the like.

The receiving attachment 316 may be coupled to the second panel 326, for example, by coupling the flange 322 to the second panel 326. In various embodiments, the second panel 326 may include a bump-up 330 onto which the flange 322 is fastened, such as by use of fasteners or the like. In various embodiments, the bump-ups 328, 330 may not be present.

The second ends 308 of the gooseneck hinge portions 302, 304 may be coupled to the receiving attachment 316 via the pin 314. For example, the second ends 308 of the gooseneck hinge portions 302, 304 may be located in the U-shaped slot 318 such that the apertures 310 of the portions 302, 304 align with apertures 332 of the receiving attachment 316. The pin 314 may then be inserted through the apertures 310 and 332 to rotatably couple the gooseneck hinge portions 302, 304 to the receiving attachment 316. Because the receiving attachment 316 is fastened to the second panel 326 and the gooseneck portions 302, 304 are fastened to the first panel 324, this rotatable coupling of the gooseneck portions 302, 304 to the receiving attachment 316 thus rotatably couples the first panel 324 to the second panel 326.

The gooseneck curves 312 result in the second ends 308 of the gooseneck portions 302, 304 being received by the U-shaped slot 318 in response to the first panel 324 being rotated towards the second panel 326. That is, in response to rotation of the first panel 324 towards the second panel 326, a portion of the gooseneck portions 302, 304 (e.g., a portion between the second ends 308 and the gooseneck curves 312) may be received by the U-shaped slot 318. In that regard, the gooseneck curves 312 result in the gooseneck hinge assembly 300 facilitating rotation of the first panel 324 relative to the second panel 326 without any portion of the first panel 324 or the second panel 326 being cut out to facilitate any hinge portion. This desirably increases surface coverage of the panels 324, 326.

In various embodiments, one or both of the gooseneck portions 302, 304 may include a lightening hole 350. The lightening hole 350 may extend through a portion or the entire area of the respective gooseneck portion 302, 304. The lightening hole 350 may reduce an amount of material present in the respective gooseneck portion 302, 304, thus desirably reducing a total weight of the gooseneck hinge assembly 300.

Because the gooseneck portions 302, 304 are provided as two portions rather than a single gooseneck portion, failure of one of the gooseneck portions 302, 304 still allows rotation of the first panel 324 relative to the second panel 326 due to the remaining non-failed gooseneck portion 302, 304. This desirably provides redundancy in the case of a failed gooseneck portion 302, 304.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gooseneck hinge assembly, comprising:
    a first gooseneck hinge portion having a first portion first end configured to be coupled to a first surface, a first portion second end having a first portion aperture configured to receive a pin, and a first gooseneck curve between the first portion first end and the first portion second end;
    a second gooseneck hinge portion being a mirror image of the first gooseneck hinge portion and having a second portion first end configured to be coupled to the first surface, a second portion second end having a second portion aperture configured to receive the pin, and a second gooseneck curve between the second portion first end and the second portion second end; and
    the pin coupled to a second surface and configured to extend through the first portion aperture and the second portion aperture to facilitate rotation of the second surface relative to the first surface.

2. The gooseneck hinge assembly of claim 1, wherein the first gooseneck hinge portion defines a first portion flange configured to extend parallel to the first surface and to be coupled to the first surface, and the second gooseneck hinge portion defines a second portion flange configured to extend away from the first portion flange, to extend parallel to the first surface, and to be coupled to the first surface.

3. The gooseneck hinge assembly of claim 2, further comprising a receiving attachment configured to be coupled to the second surface and defining a U-shaped slot for receiving the first portion second end and the second portion second end such that the pin extends through the receiving attachment, the first portion aperture, and the second portion aperture.

4. The gooseneck hinge assembly of claim 3, wherein the receiving attachment further includes a receiving flange extending parallel to the second surface and configured to be coupled to the second surface.

5. The gooseneck hinge assembly of claim 3, wherein the first gooseneck hinge portion, the second gooseneck hinge portion, and the receiving attachment are each composed in part of a metallic material.

6. The gooseneck hinge assembly of claim 3, wherein the U-shaped slot is configured to receive a portion of the first gooseneck curve and the second gooseneck curve in response to the rotation of the second surface relative to the first surface.

7. The gooseneck hinge assembly of claim 1, wherein the gooseneck hinge assembly is configured for use with a nacelle of an aircraft.

8. The gooseneck hinge assembly of claim 7, wherein the first surface is a first composite panel of the nacelle and the second surface is a second composite panel of the nacelle.

9. The gooseneck hinge assembly of claim 8, wherein the first composite panel defines a bump-up, the first gooseneck hinge portion defines a first portion flange configured to extend parallel to the first surface and to be coupled to the bump-up, and the second gooseneck hinge portion defines a second portion flange configured to extend away from the first portion flange, to extend parallel to the first surface, and to be coupled to the bump-up.

10. The gooseneck hinge assembly of claim 8, wherein at least one of the first composite panel or the second composite panel is a portion of a fan cowl of the nacelle.

11. A gooseneck hinge assembly for use in a nacelle, comprising:
    a first gooseneck hinge portion having a first portion first end configured to be coupled to a first panel, a first portion second end having a first portion aperture configured to receive a pin, and a first gooseneck curve between the first portion first end and the first portion second end;
    a second gooseneck hinge portion being a mirror image of the first gooseneck hinge portion and having a second portion first end configured to be coupled to the first panel, a second portion second end having a second portion aperture configured to receive the pin, and a second gooseneck curve between the second portion first end and the second portion second end; and
    the pin coupled to a second panel and configured to extend through the first portion aperture and the second portion aperture to facilitate rotation of the second panel relative to the first panel.

12. The gooseneck hinge assembly of claim 11, wherein the first gooseneck hinge portion defines a first portion flange configured to extend parallel to the first panel and to be coupled to the first panel, and the second gooseneck hinge portion defines a second portion flange configured to extend away from the first portion flange, to extend parallel to the first panel, and to be coupled to the first panel.

13. The gooseneck hinge assembly of claim 12, further comprising a receiving attachment configured to be coupled to the second panel and defining a U-shaped slot for receiving the first portion second end and the second portion second end such that the pin extends through the receiving attachment, the first portion aperture, and the second portion aperture.

14. The gooseneck hinge assembly of claim 13, wherein the receiving attachment further includes a receiving flange extending parallel to the second panel and configured to be coupled to the second panel.

15. The gooseneck hinge assembly of claim 13, wherein the first gooseneck hinge portion, the second gooseneck hinge portion, and the receiving attachment are each composed in part of a metallic material.

16. The gooseneck hinge assembly of claim 13, wherein the U-shaped slot is configured to receive a portion of the first gooseneck curve and the second gooseneck curve in response to the rotation of the second panel relative to the first panel.

17. The gooseneck hinge assembly of claim 11, wherein the first panel defines a bump-up, the first gooseneck hinge portion defines a first portion flange configured to extend parallel to the first panel and to be coupled to the bump-up, and the second gooseneck hinge portion defines a second portion flange configured to extend away from the first portion flange, to extend parallel to the first panel, and to be coupled to the bump-up.

18. The gooseneck hinge assembly of claim 17, wherein at least one of the first panel or the second panel is a portion of a fan cowl of the nacelle.

19. A gooseneck hinge assembly, comprising:
a first gooseneck hinge portion having a first portion first end configured to be coupled to a first surface, a first portion second end having a first portion aperture configured to receive a pin, and a first gooseneck curve between the first portion first end and the first portion second end;
a second gooseneck hinge portion being a mirror image of the first gooseneck hinge portion and having a second portion first end configured to be coupled to the first surface, a second portion second end having a second portion aperture configured to receive the pin, and a second gooseneck curve between the second portion first end and the second portion second end;
a receiving attachment configured to be coupled to a second surface and defining a U-shaped slot for receiving the first portion second end and the second portion second end; and
the pin configured to extend through the receiving attachment, the first portion aperture, and the second portion aperture to facilitate rotation of the second surface relative to the first surface.

20. The gooseneck hinge assembly of claim 19, wherein the first gooseneck hinge portion defines a first portion flange configured to extend parallel to the first surface and to be coupled to the first surface, and the second gooseneck hinge portion defines a second portion flange configured to extend away from the first portion flange, to extend parallel to the first surface, and to be coupled to the first surface.

* * * * *

UNITED STATES PATENT AND TRADEMARK OFFICE
CERTIFICATE OF CORRECTION

PATENT NO. : 11,384,660 B1  
APPLICATION NO. : 17/133351  
DATED : July 12, 2022  
INVENTOR(S) : Win On et al.

Page 1 of 1

It is certified that error appears in the above-identified patent and that said Letters Patent is hereby corrected as shown below:

On the Title Page

Item (65) please insert -- Prior Publication Data US 2022/0195890 A1 Jun. 23, 2022 --

Signed and Sealed this  
Twenty-fifth Day of October, 2022

Katherine Kelly Vidal  
*Director of the United States Patent and Trademark Office*